United States Patent
Anagnostopoulos

(10) Patent No.: US 10,824,713 B2
(45) Date of Patent: Nov. 3, 2020

(54) SPATIOTEMPORAL AUTHENTICATION

(71) Applicant: Ordnance Survey Limited, Southampton, Hampshire (GB)

(72) Inventor: Theodoros Anagnostopoulos, Southampton Hampshire (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 173 days.

(21) Appl. No.: 15/976,517

(22) Filed: May 10, 2018

(65) Prior Publication Data

US 2018/0341766 A1 Nov. 29, 2018

(30) Foreign Application Priority Data

May 23, 2017 (EP) .................................... 17172573

(51) Int. Cl.
| | |
|---|---|
| *G06F 21/45* | (2013.01) |
| *H04L 29/06* | (2006.01) |
| *G06F 21/31* | (2013.01) |
| *H04L 29/08* | (2006.01) |
| *G06F 21/55* | (2013.01) |
| *H04W 4/029* | (2018.01) |
| *G06K 9/00* | (2006.01) |
| *H04W 4/021* | (2018.01) |

(52) U.S. Cl.
CPC ............ *G06F 21/45* (2013.01); *G06F 21/316* (2013.01); *G06F 21/552* (2013.01); *G06K 9/00335* (2013.01); *G06K 9/00771* (2013.01); *H04L 63/08* (2013.01); *H04L 63/107* (2013.01); *H04L 67/306* (2013.01); *H04W 4/029* (2018.02); *H04L 63/0861* (2013.01); *H04W 4/021* (2013.01)

(58) Field of Classification Search
CPC ............................. G06F 21/316; H04W 4/029
See application file for complete search history.

(56) References Cited

U.S. PATENT DOCUMENTS

| | | | |
|---|---|---|---|
| 9,313,200 B2 * | 4/2016 | Hoyos | G06K 9/00228 |
| 9,566,004 B1 * | 2/2017 | Radwin | A61B 5/1128 |
| 9,583,020 B1 * | 2/2017 | Kronfeld | G09B 19/00 |
| 10,531,287 B2 * | 1/2020 | Chakraborty | H04W 12/02 |

(Continued)

OTHER PUBLICATIONS

Joao Carlos D. Lima et al. "A Context-Aware Recommendation System to Behavioral Based Authentication in Mobile and Pervasive Environments", Embedded and Ubiquitous Computing (EUC), (2011) IFIP 9th International Conference on, IEEE, pp. 312-319, XP032074994.

(Continued)

*Primary Examiner* — Ali Shayanfar
(74) *Attorney, Agent, or Firm* — Banner & Witcoff, Ltd.

(57) ABSTRACT

A system and method of authentication is provided that uses the spatiotemporal context of a user which has been measured using third party monitoring systems. Spatiotemporal data obtained from third party systems such as CCTV networks, microphone networks, UAV networks, CAV networks, ATM networks or the like is used to determine a unique spatiotemporal fingerprint for an individual. That is, the unique identifier is not derived from a device carried by the individual. This fingerprint can then be used to verify a user and detect abnormal and unexpected behaviour.

18 Claims, 5 Drawing Sheets

(56) References Cited

U.S. PATENT DOCUMENTS

| | | | |
|---|---|---|---|
| 2004/0218894 A1* | 11/2004 | Harville | H04N 5/9201 386/241 |
| 2006/0115116 A1* | 6/2006 | Iwasaki | G06K 9/00348 382/103 |
| 2006/0242679 A1* | 10/2006 | Hutchison, III | H04N 7/17318 725/105 |
| 2011/0238751 A1* | 9/2011 | Belimpasakis | G06F 3/011 709/204 |
| 2013/0339371 A1* | 12/2013 | Hayashi | G06F 16/9537 707/743 |
| 2014/0207794 A1* | 7/2014 | Du | H04W 4/21 707/748 |
| 2014/0219531 A1* | 8/2014 | Epstein | G06T 7/20 382/131 |
| 2014/0337948 A1* | 11/2014 | Hoyos | G06Q 20/3276 726/7 |
| 2015/0309703 A1* | 10/2015 | Robertson | G10H 1/0025 715/716 |
| 2016/0253486 A1* | 9/2016 | Sarkar | G06F 21/316 726/7 |
| 2016/0295192 A1* | 10/2016 | Hsu | G06K 9/00832 |
| 2017/0072563 A1* | 3/2017 | Anderson-Sprecher | G01B 11/14 |
| 2018/0341766 A1* | 11/2018 | Anagnostopoulos | G06K 9/00771 |
| 2019/0158493 A1* | 5/2019 | Aronoff | G06F 9/4806 |
| 2019/0279029 A1* | 9/2019 | Boutant | G06K 9/6215 |

OTHER PUBLICATIONS

Albayram Yusuf et al. "A Method for Improving Mobile Authentication Using Human Spatio-Temporal Behavior", (2013) IEEE Symposium on Computers and Communications (ISCC), IEEE, pp. 305-311, XP032574324.

Extended European Search Report of EP17172573 dated Oct. 2, 2017.

* cited by examiner

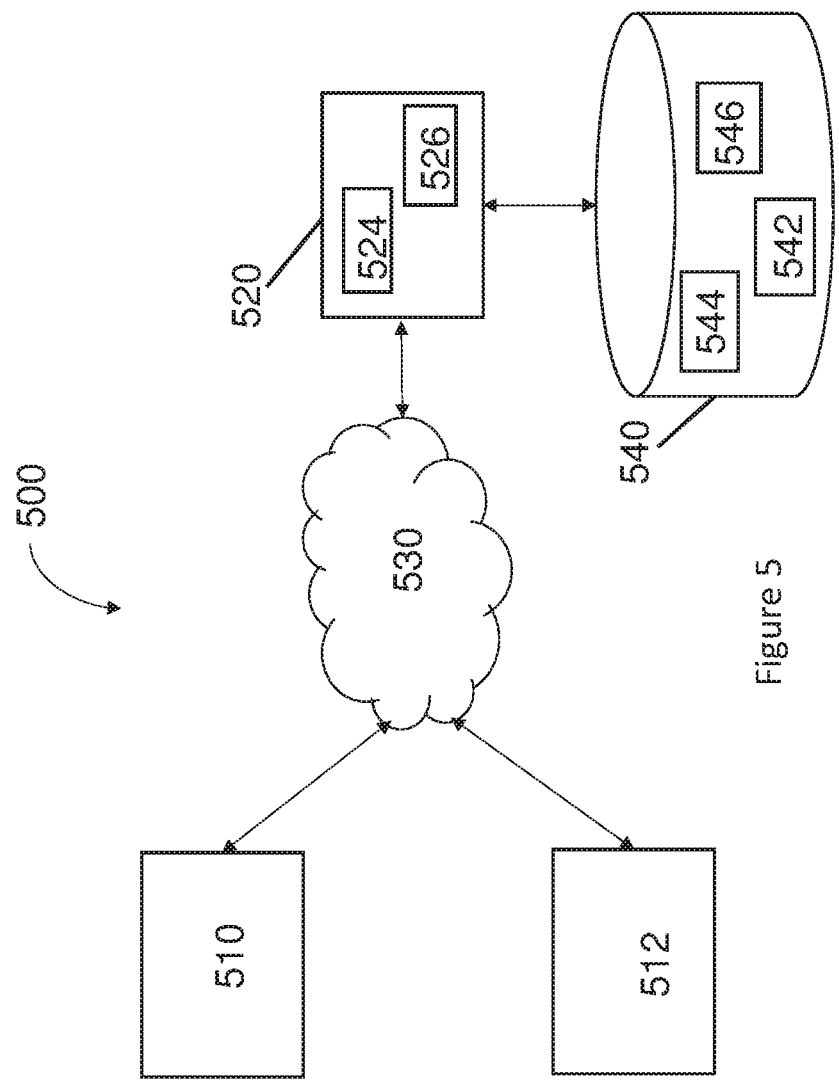

SPATIOTEMPORAL AUTHENTICATION

FIELD

Embodiments described herein relate to computer software, hardware, networks, and security, including a system and method of generating a unique identifier for use in authentication. In particular, embodiments described herein relate to a unique identifier generated based on a spatiotemporal history associated with an individual.

BACKGROUND

There are many scenarios in which user authentication is required, for example, to provide access to a particular location, to provide access to sensitive information stored on a computing system, or to allow a user to perform a particular action such as to make a bank transfer.

Various systems for performing such authentication are known in the art. For example, QR codes have been used extensively for authentication. For example, a unique QR code may be sent to a user's mobile device, which may be used once to provide authentication for a particular act. However, whilst QR codes are a promising technology for authentication they do not provide highly scaled context awareness of the user's identity. That is, it is not possible to tell that the person using the QR code is actually the authorised user. Consequently, if a different person was to gain access to the user's mobile device and obtain one of these QR codes, there would be no way of knowing that the person using the QR code was not the user for whom it was intended.

One way of providing context awareness of the user's identity is to use their spatiotemporal context, that is, hers or his commonly used spatial activities on mapped locations over certain time intervals from several seconds to many years of activity. US 2014/0341440 is one example of an identification system that uses spatiotemporal data to identify a user, in which the user's device is used to track patterns in their daily activities. However, such systems rely on the fact that the user's device is configured to track their spatiotemporal data, is activated to do so, and is actually carried by the user.

SUMMARY

Embodiments described herein address the above noted problems by providing a system and method of authentication that uses the spatiotemporal context of a user which has been measured using third party monitoring systems. Spatiotemporal data obtained from third party systems such as closed-circuit television (CCTV) networks, microphone networks, unmanned aerial vehicles (UAV) networks, connected and autonomous vehicles (CAV) networks, automated teller machine (ATM) networks, electronic pass networks or the like is used to determine a spatiotemporal fingerprint that is unique to an individual. That is, the unique identifier is not derived from a single device carried by the individual, but instead by an amalgamation of data from multiple systems with which the user interacts through the course of his day. This fingerprint can then be used to verify a user and detect abnormal and unexpected behaviour. For example, the individual may be tracked in real time, for example, by tracking a device having GPS capabilities or the like, such that authorisation is granted if the movements of the individual are in accordance with the spatiotemporal fingerprint of the individual. Conversely, any deviation from the spatiotemporal fingerprint may indicate an intrusion. For example, the individual may be attempting to access a secure area or asset for which they are not authorised, or a device associated with the individual is in the possession of an unauthorised person. Such deviation may then trigger further identification processes to confirm the identity of the individual. Deriving the spatiotemporal fingerprint from third party data eliminates the requirement that the individual is continuously carrying a device that is set up to measure their spatiotemporal data.

A first aspect described herein provides a computer-implemented method of generating a unique identifier, the method comprising receiving at least one set of sensing data from at least one network of sensing devices arranged to measure the spatiotemporal position of one or more users, determining from the at least one set of sensing data a plurality of spatiotemporal data points corresponding to the spatiotemporal position of a first user, and generating a first unique identifier corresponding to the first user in dependence on the plurality of spatiotemporal data points.

Aspects described herein may use external sensing systems that are capable of providing multiple data points that indicate the position of a person at various times to generate a unique fingerprint for that person by monitoring the individual's movements over a period of time. For example, systems such as a network of CCTV cameras, a network of microphones, a UAV network, a CAV network, an interbank network such as an ATM network, a public transport system where a payment card associated with the user may be used, or card or electronic payment terminals in shops, restaurants, or other establishments may be used. More generally, any data collection system where the location of a person is clocked or checked at various times throughout the day for whatever reason can be used to collect a plurality of spatiotemporal data points that can then be used to generate the unique fingerprint that describes the first user's usual pattern of activity. Such a fingerprint can then be used to verify the identity of the user for authentication purposes. By using external sensing systems that are not located on the user, this allows a unique identifier to be generated without needing the user to continuously carry a device that is configured to measure their spatiotemporal data.

The at least one network of sensing devices may comprise a plurality of sensing devices distributed over a defined geographic area. For example, the network of sensing devices may be a network of CCTV cameras located at various places around a town or city, and connected to face recognition systems to allow a user to be clocked at a particular location at a particular time. To provide more contextual evidence to the proposed system, another example of a sensing devices network could be a network of microphones located near to the CCTV cameras network, and connected to voice recognition systems to observe user behaviour. In this respect, networks that comprise a dense population of sensing devices over a large geographic area are able to generate a more widespread and detailed unique identifier.

The at least one network of sensing devices may comprise at least a first sensing device at a first location and a second sensing device at a second location. For example, the first sensing device may be a card reader at the entrance to a first public transport station, and second sensing device may be a second card reader at the exit to a second public transport station. As another example, the first sensing device may be an ATM machine on a first street, whilst the second sensing device may be a camera on a second street.

The first user may be repeatedly located at the first and second locations. The first user may be repeatedly located at the first location at a first time on one or more days and repeatedly located at the second location at a second time on one or more days. Using the above examples, the first and second public transport stations may be those visited by the user five days a week on their route to work, the ATM machine may be on the same street as the user's home and visited every Monday morning, and the camera may be located on the street on which their place of work is located such that they pass it every day on their route to work. In some cases, the first user may be at the first and second locations on a periodic basis, or it may be that they visit those locations once or twice a week at varying times.

The plurality of spatiotemporal data points determined from the at least one set of sensing data may therefore comprise a first set of spatiotemporal data points corresponding to the first location and the first time, and a second set of spatiotemporal data points corresponding to the second location and the second time.

The first location may be a first building and the second location may be a second building.

The at least one network of sensing devices are independent of the first user. That is to say, the sensing devices are not carried by the user and there is no requirement that the user activate the sensing devices in order to measure the spatiotemporal data.

The determining from the at least one set of sensing data a plurality of spatiotemporal data points may comprise identifying the first user at a plurality of spatiotemporal positions. This identifying may be done in one of many ways depending on the sensing device from which the sensing data came. For example, if the network of sensing devices is a network of CCTV cameras, facial recognition software may be used to identify the first user in the CCTV footage. In addition, if the network of sensing devices is a network of microphones, voice recognition software may be used to identify the first user in the microphone recordings. As another example, if the network of sensing devices is an interbank network comprising a plurality of ATMs and payment points, or a travel network comprising a plurality of electronic card readers, the first user may be identified as the individual associated with a card or other payment device, include mobile devices having electronic wallets, used at one of the devices in those networks.

The generating the first unique identifier may comprise calculating a plurality of vectors having a spatial and temporal component. Collectively, these vectors produce a spatiotemporal map of an individual's daily activities.

The at least one network of sensing devices is at least one of a group of: a closed-circuit television (CCTV) system, a microphone system, a UAV network, a CAV network, an interbank network, and a network of electronic card or e-payment device readers.

The receiving the at least one set of sensing data may comprise receiving at least one set of sensing data recorded over a predetermined amount of time. For example, the predetermined amount of time may be at least one month, or preferably, at least one year. In this respect, the longer the predetermined time, the more sensing data is collected, and thus the more spatiotemporal data points can be determined for generating the unique identifier. Generally, the more spatiotemporal data points that are used, the more complex the unique identifier is, making it more difficult to imitate the first user with which it is associated.

The method may further comprise receiving biometric data corresponding to the first user and adding the received biometric data to the first unique identifier. The biometric data may comprise at least one of: facial patterns, gesture patterns and vocal communication patterns. This adds an additional layer of complexity to the unique identifier, making it even more difficult to imitate.

The method may further comprise receiving authorisation data corresponding to the first user, and adding the received authorisation data to the first unique identifier. For example, the authorisation data may comprise information relating to an asset and/or location, wherein the first user is authorised to access the asset and/or location. Alternatively, the authorisation data may comprise information relating to an asset and/or location, wherein the first user is unauthorised to access the asset and/or location.

A second aspect described herein provides a system comprising a processor, and a computer readable medium storing one or more instruction(s) arranged such that when executed the processor is caused to perform the method according to the first illustrative aspect above.

A third aspect described herein provides a method of performing authentication, comprising monitoring the position of a first user in dependence on a unique identifier corresponding to the first user, wherein the unique identifier is generated according to the method of the first illustrative aspect above, and verifying the identity of the first user if the monitored position matches the unique identifier.

The method of performing authentication may further comprise initiating an identification process if the monitored position is different to the unique identifier. That is, if the monitored position deviates from the expected activity defined by the spatiotemporal data points used to generate the unique identifier, formal identification may be required to verify the identity of the first user and/or verify that the first user is in an authorised location.

The formal identification process may comprise analysing one or more video files received from one or more video cameras located in the monitored position to verify the identity of the first user. The analysing may be performed using facial recognition software.

In addition the formal identification process could be enhanced by analysing one or more sound files received from one or more microphones located in the monitored position to verify the identity of the first user. Analyses could be performed using voice recognition software.

The method of performing authentication may further comprise activating an alarm, for example, if the identity of the first user cannot be verified or if the first user is not authorised to be in the monitored position.

BRIEF DESCRIPTION OF THE DRAWINGS

Further features and advantages will become apparent from the following description of embodiments and aspects described herein, presented by way of example only, and by reference to the drawings, wherein:

FIG. 5 is a block diagram illustrating an example system in which the authorisation process of FIG. 4 may be implemented.

DETAILED DESCRIPTION

Figure 1:
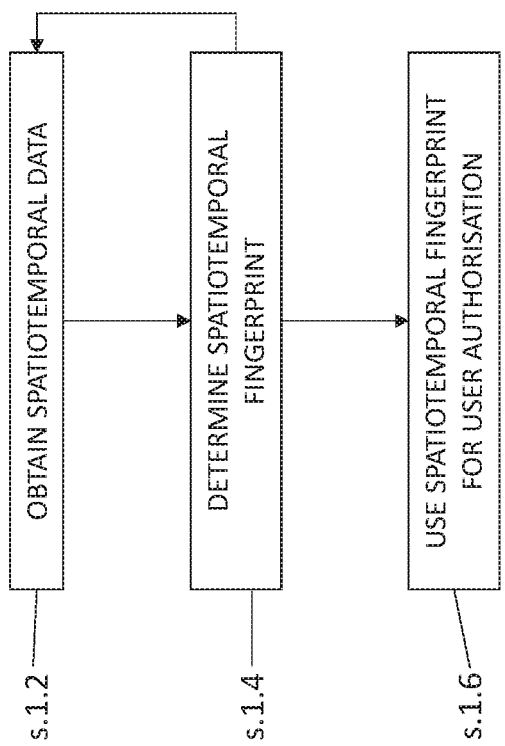
FIG. 1 is a flow diagram illustrating a first embodiment showing one or more illustrative aspects described herein.

Embodiments and aspects described herein, as illustrated by FIG. 1, provide a method of obtaining a unique identifier which can then be used to verify an individual's identity and authorise that person for a particular purpose, for example, gain access to a secure location, gain access to sensitive matter or perform a particular action.

The unique identifier is based on the spatiotemporal history of the individual, that is, their daily activities recorded over a prolonged period of time. The spatiotemporal data is collected using third party monitoring systems (s.1.2) that are capable of tracking the movements of an individual over a period of time to provide data that records the individual's location, and the time and date that they were at each location. The third party monitoring systems utilise sensing equipment that is not located on the individual, but rather sensing equipment that is located in a number of geographical locations. That is to say, the sensing devices are independent of the user. For example, the third party monitoring system may be a network of CCTV cameras transmitting surveillance footage, which can be processed to identify an individual at a particular location and time. In such cases, facial recognition software may be used to identify the user in the CCTV footage. Spatiotemporal data may also be derived from other third party sources, for example, an interbank network recording transactions made using a card or other payment device (such as a mobile phone) associated with the individual. Data received from the interbank network may then be used to derive spatiotemporal data indicating where and when the individual has used their bank card or other payment device. Another example may be a transport system that uses electronic passes for access and payment, whether the passes be physical card based, or again be embodied within a mobile device provided with RFID style functionality, and capable of emulating a payment or travel card. Other examples of third party monitoring systems that may be used to collect spatial temporal data include microphone networks, unmanned aerial vehicles (UAV) networks, and connected and autonomous vehicles (CAV) networks.

Spatiotemporal data can thus be collected based on the individual's time stamped location at various times throughout the day as recorded by these external sensing systems. This data may be recorded over several weeks, months or years to build up a picture of the individual's routine activities to thereby determine a spatiotemporal fingerprint for that individual (s.1.4).

As the spatiotemporal data is recorded over time, patterns will start to emerge in the locations that the individual frequents regularly, as well as the time or day that the individual is usually at those locations. For example, the individual may follow the same route from their home to work, twice a day, five days a week, or the individual may visit a particular location once a month at a specific time. Therefore, the longer the spatiotemporal data is recorded, the more patterns of activity that emerge and the more detailed the resulting fingerprint, and it will be appreciated that the spatiotemporal fingerprint will evolve over time as more spatiotemporal data is collected. For example, the individual may visit a location once every four months. At first, this event may look like an anomaly, however, after several months of recorded spatiotemporal data it will emerge that this is a pattern of activity that can be written into the fingerprint.

As such, a unique spatiotemporal fingerprint is derived that maps the routine day to day movements of the individual, whilst also taking into account events that occur on a less regular basis but that are still part of the individual's spatiotemporal history. In this respect, the spatiotemporal fingerprint may be a series of spatiotemporal vectors, that is, vectors having a spatial and temporal component, describing the user's spatiotemporal context.

In some specific cases, the spatiotemporal fingerprint may also include information relating to high impact areas that the individual may or may not be authorised to enter. In this respect, the high impact areas may be marked by static or dynamic geofences created to monitor and protect an asset in that area, with the spatiotemporal fingerprint comprising an indication as to whether it is considered normal behaviour for that user to cross the geofence. This is particularly useful in security systems monitoring a specific location, as will be described in more detail below.

Figure 2:
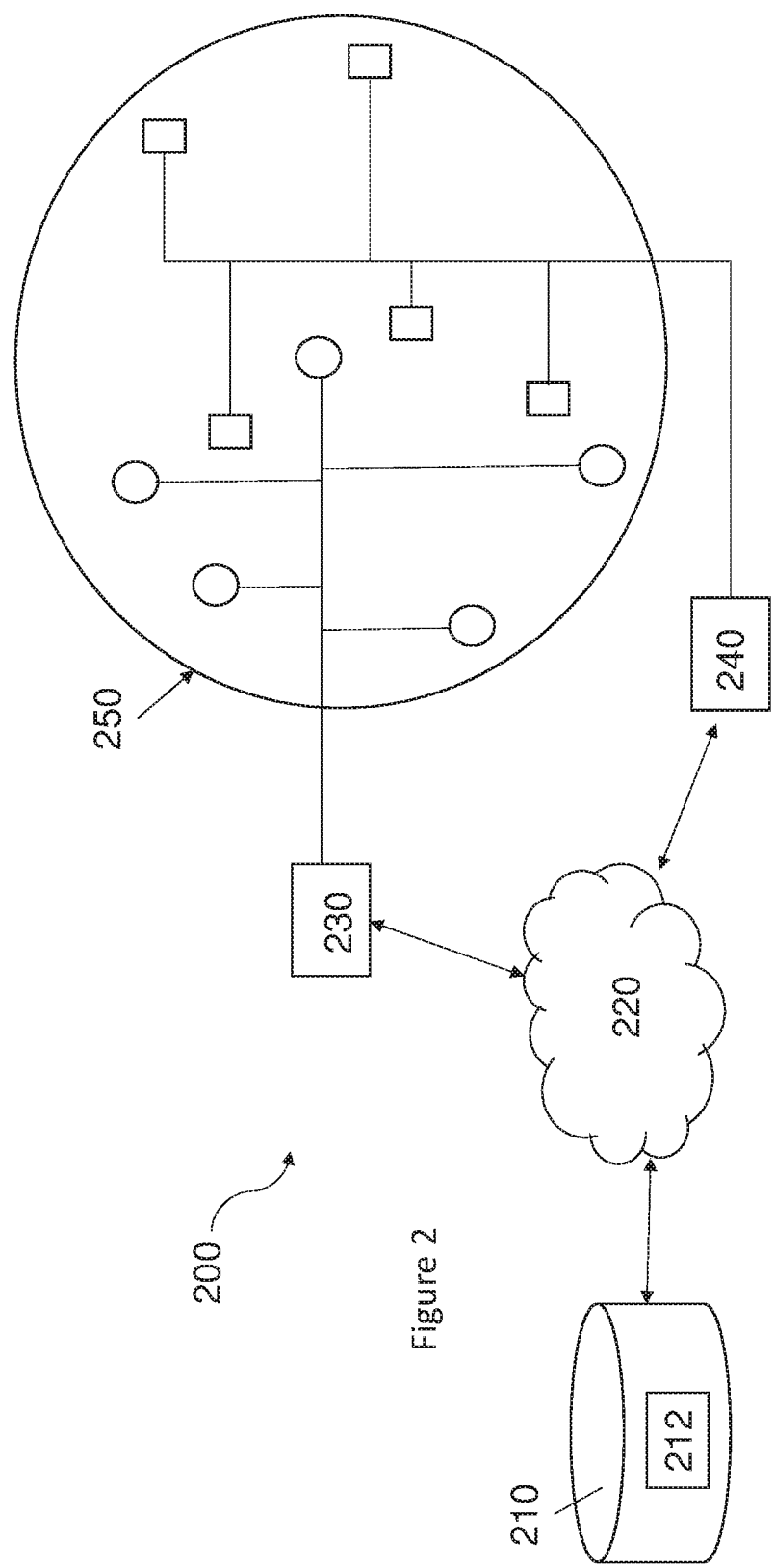
FIG. 2 is a block diagram illustrating a system used to implement one or more illustrative aspects described herein.

FIG. 2 illustrates one example of a tracking system according to illustrative aspects described herein. Generally, the system described below implements the method described in detail above, and reference should be made to the above when considering the various steps and processes described below.

FIG. 2 shows a system 200 in which a server 210 is in communication with third party servers 230, 240 via a network 220. The server 210 comprises a processor 212 arranged to carry out computing operations. The third party servers 230, 240 are each connected to a network of sensing devices distributed throughout a geographical area 250, the sensing devices being capable of collecting data from which spatiotemporal information corresponding to an individual can be derived. Data recorded by each network of sensing devices is collected at the third party servers 230, 240 and then communicated to the server 210 upon request via the network 220. The processor 212 then processes the data received from the third party servers 230, 240 to extract spatiotemporal data corresponding to an individual and generate a unique fingerprint based on the spatiotemporal data.

For example, one of the third party servers 230 may be that of an interbank network in communication with a plurality of ATMs and payment points distributed around a town 250. Every time an individual completes a transaction using a credit or debit card, a data point is recorded comprising a spatial reference corresponding to the location of the ATM or payment point, and a time stamp corresponding to the time that the transaction took place. The debit or credit card that recorded that data point can be easily associated with the individual, for example, by means of the name identified on that card. Every time a data point is recorded, it is collected at the third party server 230 and then communicated to the server 210 via the network 220. The data points already comprise a spatial and temporal component, and can therefore be used directly to generate the spatiotemporal fingerprint. The second third party server 240 may then be that of a CCTV system in communication with a plurality of cameras distributed about the town 250. Video footage recorded at each of the cameras is transmitted to the CCTV server 240 and then communicated to the server 210 via the network 220. The processor 212 will then analyse the video footage to identify the individual, for example, using facial recognition software. The video footage is embedded with spatial and temporal metadata, therefore, every time the individual is detected, a spatiotemporal data point can be extracted from the frame in which they are detected, the spatial component corresponding to the location of the camera from which the frame came and the temporal component corresponding to the time stamp of that frame. Spatiotemporal data corresponding to an individual can thus be collected from the interbank server 230 and the CCTV server 240 to generate a spatiotemporal fingerprint for that individual.

As such, the system 200 comprises a plurality of sensing devices located at different locations within the geographic area 250, for example, the sensing devices may be located in several different buildings and on several different streets within the geographic area 250. Spatiotemporal data is then collected from the sensing devices at locations that the individual visits repeatedly. For example, the individual may repeatedly visit a first building around the same time on one or more days a week, and similarly visit a second building at another time on one or more days a week. As such, the spatiotemporal data collected for that individual comprises a series of data points corresponding to the first and second buildings and the times at which those buildings are visited.

It will be appreciated by the skilled person that the third party servers 230, 240 may be connected to any sensing devices capable of recording a time-stamped spatial reference that can be associated with an individual.

Figure 3:
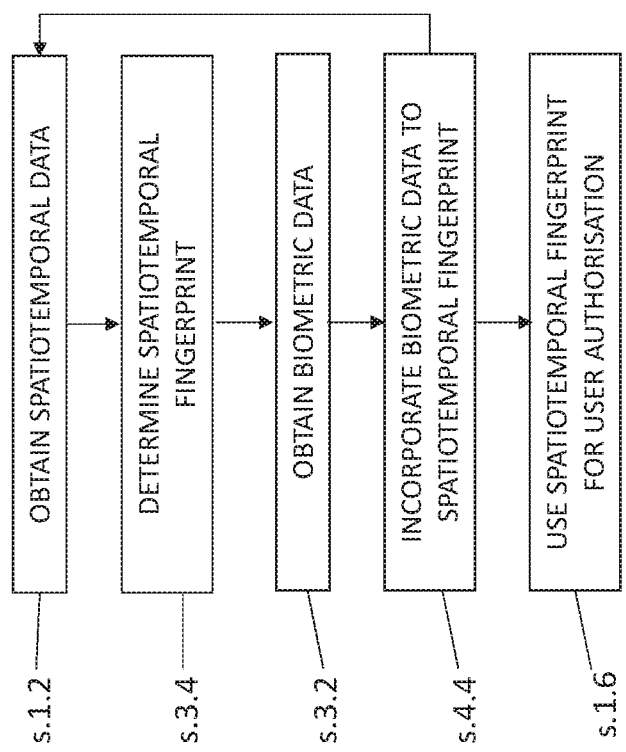
FIG. 3 is a flow diagram illustrating a second embodiment showing one or more illustrative aspects described herein.

In some cases, the spatiotemporal fingerprint may also be supplemented with biometric data, as illustrated in FIG. 3. For example, biometric data may be obtained from analysis of a network of cameras and microphones (s.3.2), from which the individual's facial patterns, gesture patterns and vocal communication patterns can be determined. This biometric data can then be added to the spatiotemporal fingerprint of the individual (s.3.4). This can be particularly useful in providing a further way of identifying the individual in authorisation systems, as described in more detail below. For example, where video footage is collected from a network of CCTV cameras, the video footage may be analysed further to derive biometric data for the individual in addition to the spatiotemporal data.

Once the spatiotemporal fingerprint has been determined, the spatiotemporal fingerprint may be used as part of an authorisation system, an example of which will now be described.

Figure 4:
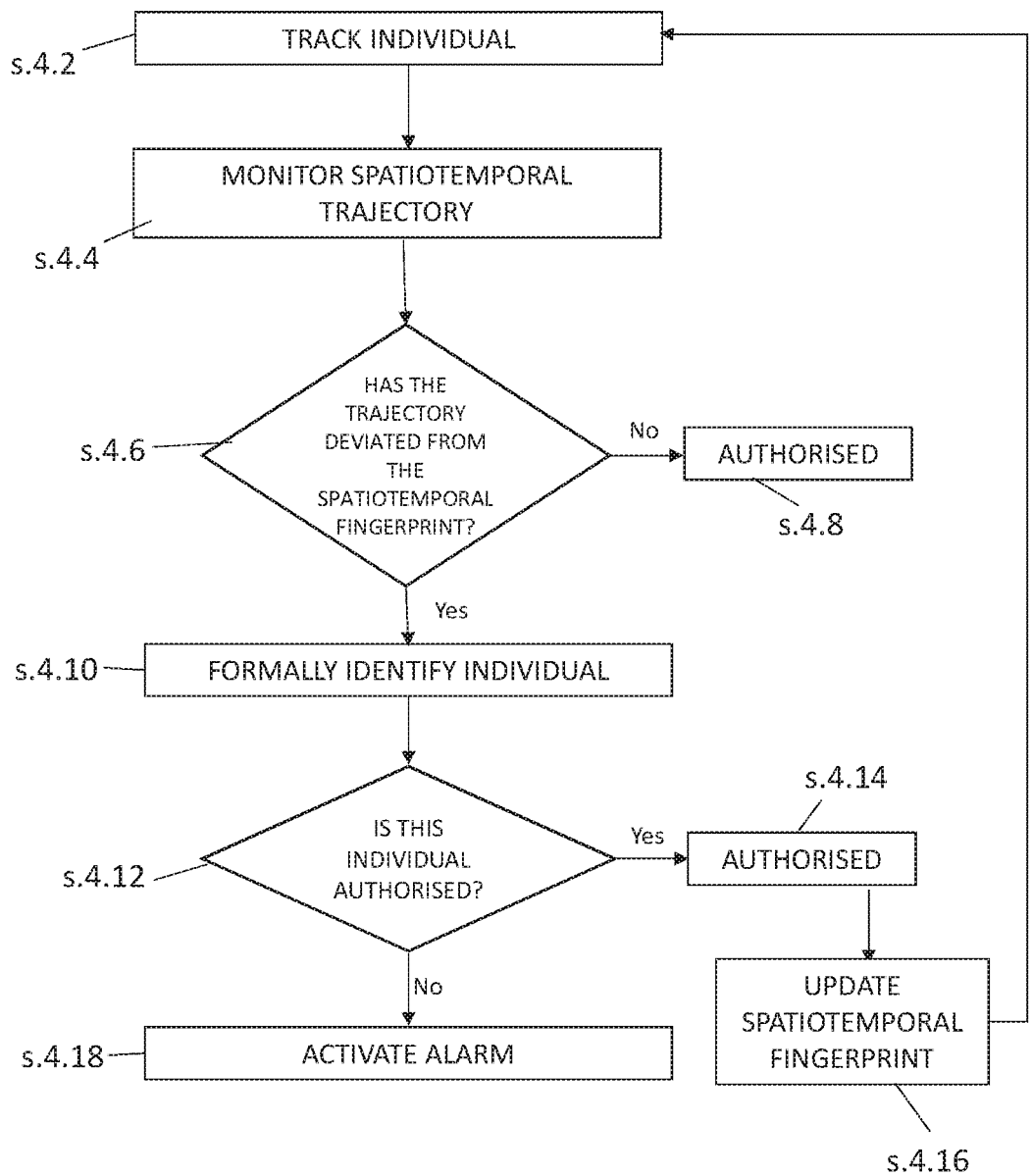
FIG. 4 is a flow diagram illustrating an authorisation process which implements one or more aspects described herein.

FIG. 4 illustrates an example method of authentication that uses the spatiotemporal fingerprint to verify the identity of an individual and to anticipate unauthorised behaviour. To monitor a particular area or location, individuals within the monitored area may be tracked (s.4.4), for example, by using the GPS capability of a mobile device associated with the individual. In this respect, the spatial context of an individual is expressed as an actual geographic coordinate or as a relational coordinate of a predefined location in an infrastructure, the spatial context being time stamped to thereby monitor the spatiotemporal trajectory of that individual (s.4.4).

If the individual crosses a geofence of a high impact area or requests access to a secure location or asset, the spatiotemporal trajectory is compared to the spatiotemporal fingerprint of the individual to determine whether that individual is deviating from their normal behaviour (s.4.6), for example, by crossing a geofence that they are not authorised to cross or significantly deviating from the normal pattern of activity. If the trajectory has not deviated from the spatiotemporal fingerprint, that is, the movements of the individual are as expected, no alarm is triggered and the individual is authorised to access the area or asset (s.4.8). If the trajectory of the individual has deviated from spatiotemporal fingerprint, an early warning is triggered and a request to formally identify the individual is initiated (s.4.10).

Various methods may be employed to try to formally identify the individual. For example, video and/or audio files may be obtained from a CCTV system operating in the location of the individual. Facial and/or vocal recognition software may then be employed to analyse the video and/or audio files to determine the identity of the individual (s.4.12). If upon identification, the individual is known and considered to be authorised for access to that area or asset (s.4.14), the early warning can be deactivated and authorisation of the individual confirmed. This may be the case, for example, where the individual has only been authorised for a particular area or asset, and is consequently not yet part of the individual's spatiotemporal fingerprint. In such cases, new spatiotemporal data may be derived from this deviation in expected activity and used to update the spatiotemporal fingerprint for that individual (s.4.16).

If the individual cannot be identified, or alternatively, the individual can be identified but is not an authorised for access to the area or asset, an alarm may be activated (s.4.18) to prompt further action.

FIG. 5 illustrates one example of an authorisation system in which aspects described herein may be used. Generally, the system described below implements the method described in detail above, and reference should be made to the above when considering the various steps and processes described below.

FIG. 5 shows a system 500 comprising a server 520 in communication with third party servers 510, 512 via a network 530 through a communications interface 524. The server 520 comprises a processor 526 arranged to carry out computing operations, and is also in communication with a core server 540. The core server 540 runs different software implemented modules which carry out different tasks or provide particular data when required by the processor 526. More specifically, a spatiotemporal fingerprint module 542 is arranged to calculate and store the spatiotemporal fingerprints, whilst a spatiotemporal trajectory module 544 is arranged to track the spatiotemporal trajectory of individuals within an area to be monitored in dependence on the spatiotemporal fingerprints, as described above. The core server 540 also comprises an authorisation module 546 arranged to perform formal identification of any individuals that have a spatiotemporal trajectory deviating from the normal and authorised behaviour provided for in the spatiotemporal fingerprint.

The server 520 is arranged to receive data via network 530 from the third party servers 510, 512, from which spatiotemporal data for input to the adjacency module 544 can be extracted. This data may include any form of information from which the location of an individual can be tracked. The server 520 may also be arranged to receive instructions from a third party sever 510, 512 relating to one or more individuals for which a spatiotemporal fingerprint is to be generated. These instructions may also provide details of the area that is to be monitored, including any geofences for specific high impact areas, and an indication of which individuals are authorised to enter the high impact areas and which individuals are not. Data and instructions received from the third party servers 510, 512 is communicated to the core server 540, which inputs the data to the spatiotemporal module 542. The spatiotemporal module 542 then extracts spatial and temporal data relating to an individual identified in the instructions and uses this to generate a spatiotemporal fingerprint. The spatiotemporal trajectory module 544 is then arranged to track the one or more individuals in the area to be monitored as described above based on spatiotemporal fingerprints extracted from the spatiotemporal fingerprint module 542. When an individual crosses a geofence or requests access to an area or asset within the area being monitored, the spatiotemporal trajectory module 544 compares the individual's movements to their spatiotemporal finger to determine whether the individual has deviated therefrom. If the individual has deviated from the spatiotemporal fingerprint, the spatiotemporal trajectory module 544 will send an alert to the authorisation module 546, which prompts the authorisation module 546 to carry out formal identification of the individual as described above. If the authorisation module 546 detects an unauthorised individual, an alert is then communicated to the server 520 to signal to the user that further action may be required. If the authorisation module 546 verifies that the individual is authorised, the authorisation module 546 will communicate this information to the spatiotemporal fingerprint module 542, which will then update the spatiotemporal fingerprint for that individual.

An example of the system 500 of FIG. 5 in use will now be described. The server 520 may first receive instructions from a first third party server 510 via network 530. The first third party server 510 may be that of a company wanting to monitor the whereabouts of personnel moving around a building that comprises restricted areas and/or assets (for example, particular files stored on a computer system). The instructions may therefore include a list of personnel authorised to enter the building, details regarding the restricted assets and/or areas and the personnel who are authorised to access each of those restricted assets and/or areas.

In order to calculate spatiotemporal fingerprints for each of the personnel, the server 520 may then request data from a second third party server 512. The second third party server 512 may be that of a CCTV provider, the data being video files relating to a network of CCTV cameras installed in a particular geographic area. In this respect, the geographic area might be single building or an area of land, for example, the geographic area might be the building to be monitored, with CCTV cameras being located in one or more rooms of the building, or include the whole town or city in which the building is located with CCTV cameras being located in a number of other buildings within that town.

The instructions received from the first third party server 510 and the data received from the second third party server 512 will then be communicated to the core server 540, which inputs the instructions and the data to the spatiotemporal fingerprint module 542 for analysis. For each individual identified in the instructions, the spatiotemporal fingerprint module 542 will analyse their movements as shown in the CCTV footage to determine patterns of activity that can be written into their spatiotemporal fingerprint. In order to do this, the spatiotemporal fingerprint module 542 will implement some suitable means of identifying each individual in the footage, for example, using facial recognition software. As well as a series of spatiotemporal vectors describing their daily activities, the resulting spatiotemporal fingerprint may also include information relating to the areas and assets for which the individual has authorised access and/or the areas and assets for which the individual does not have authorised access.

Once the spatiotemporal fingerprints for the required personnel have been determined, the spatiotemporal trajectory module 544 will monitor the movements of the personnel in dependence on the spatiotemporal fingerprints. In this respect, the spatiotemporal trajectory of the personnel may be tracked using any suitable means, for example the GPS capability of a device associated with an individual, CCTV cameras or electronic security passes used to open doors within the building. Specifically, the spatiotemporal trajectory module 544 will track the movements of the individual, and if that individual crosses a geofence or requests access to an area or asset, the spatiotemporal trajectory module 544 will compare the individual's movements to their spatiotemporal fingerprint. If the spatiotemporal trajectory matches the spatiotemporal fingerprint, the individual is authorised and provided with the necessary access. If the trajectory has deviated from the spatiotemporal fingerprint, for example, by crossing a geofence into an area that they are not authorised to be, an alert is triggered and communicated to the authorisation module 546.

The authorisation module 546 will then initiate formal identification of the individual, as described above. For example, the authorisation module 546 may send a request to the server 520 for real-time CCTV footage from the second third party server 512 in the location where the unauthorised individual has been detected. On receipt of the relevant CCTV video files, the authorisation module 546 will analyse the video files to identify the individual, for example, by manual inspection or using facial recognition software. If the individual cannot be identified as recognised personnel, or is identified as personnel not authorised for access to that particular area and/or asset, the authorisation module 546 will send an alert to the server 520 triggering an alarm.

In the above example, the spatiotemporal fingerprint module 542, the spatiotemporal trajectory module 544 and the authorisation module 546 are all implemented on the same processor and core server. However, it will be appreciated by the skilled person that each of these modules may be implemented on separate systems. For example, the spatiotemporal fingerprints may be generated separately and distributed to a third party for use in an authentication system.

Various modifications, whether by way of addition, deletion and/or substitution, may be made to all of the above described embodiments to provide further embodiments, any and/or all of which are intended to be encompassed by the appended claims.

What is claimed is:

1. A computer-implemented method of generating a unique identifier, the method comprising:
receiving at least one set of sensing data from at least one network of sensing devices arranged to measure a spatiotemporal position of one or more users, wherein the at least one network of sensing devices comprises a plurality of cameras distributed over a defined geographic area, the plurality of cameras being remote from the one or more users and configured to measure the spatiotemporal position of the one or more users upon detection thereof;
determining from the at least one set of sensing data a plurality of spatiotemporal data points corresponding to the spatiotemporal position of a first user captured over a pre-determined period of time at a plurality of locations within the defined geographic area, wherein a portion of the plurality of spatiotemporal data points corresponds to each of the plurality of locations, the first user having been repeatedly detected by a camera at the respective location during the pre-determined period of time; and generating a first unique spatio-temporal identifier corresponding to the first user in dependence on the plurality of spatiotemporal data points, wherein the first spatio-temporal identifier is used to verify an identity of the first user based on a monitored position of the first user.

2. A method according to claim 1, wherein the at least one network of sensing devices comprises at least a first sensing device at a first location and a second sensing device at a second location.

3. A method according to claim 2, wherein the first user is repeatedly located at the first and second locations.

4. A method according to claim 3, wherein the first user is repeatedly located at the first location at a first time on one or more days and repeatedly located at the second location at a second time on one or more days.

5. A method according to claim 4, wherein the plurality of spatiotemporal data points determined from the at least one set of sensing data comprises a first set of spatiotemporal data points corresponding to the first location and the first time, and a second set of spatiotemporal data points corresponding to the second location and the second time.

6. A method according to claim 2, wherein the first location is a first building and the second location is a second building.

7. A method according to claim 1, wherein the at least one network of sensing devices are independent of the first user.

8. A method according to claim 1, wherein the determining from the at least one set of sensing data a plurality of spatiotemporal data points comprises identifying the first user at a plurality of spatiotemporal positions.

9. A method according to claim 1, wherein the generating the first unique identifier comprises calculating a plurality of vectors having a spatial and temporal component.

10. A method according to claim 1, wherein the predetermined amount of time is at least one month.

11. A method according to claim 1, wherein the predetermined amount of time is at least one year.

12. A method according to claim 1, wherein the method further comprises receiving biometric data corresponding to the first user and adding the received biometric data to the first unique identifier.

13. A method according to claim 12, wherein the biometric data comprises at least one of: facial patterns, gesture patterns and vocal communication patterns.

14. A method according to claim 1, wherein the method further comprises receiving authorisation data corresponding to the first user, and adding the received authorisation data to the first unique identifier.

15. A method according to claim 14, wherein the authorisation data comprises information relating to an asset and/or location, wherein the first user is authorised to access the asset and/or location.

16. A method according to claim 14, wherein the authorisation data comprises information relating to an asset and/or location, wherein the first user is unauthorised to access the asset and/or location.

17. A system comprising:
a processor; and a computer readable medium storing one or more instruction(s) arranged such that when executed the processor is caused to perform:
receiving at least one set of sensing data from at least one network of sensing devices arranged to measure a spatiotemporal position of one or more users, wherein the at least one network of sensing devices comprises a plurality of cameras distributed over a defined geographic area, the plurality of cameras being remote from the one or more users and configured to measure the spatiotemporal position of the one or more users upon detection thereof;
determining from the at least one set of sensing data a plurality of spatiotemporal data points corresponding to the spatiotemporal position of a first user captured over a pre-determined period of time at a plurality of locations within the defined geographic area, wherein a portion of the plurality of spatiotemporal data points corresponds to each of the plurality of locations, the first user having been repeatedly detected by a camera at the respective location during the pre-determined period of time; and
generating a first unique spatio-temporal identifier corresponding to the first user in dependence on the plurality of spatiotemporal data points, wherein the first spatio-temporal identifier is used to verify an identity of the first user based on a monitored position of the first user.

18. A method of performing authentication, comprising:
monitoring a position of a first user in dependence on a unique spatio-temporal identifier corresponding to the first user, wherein the unique spatio-temporal identifier is generated by:
receiving at least one set of sensing data from at least one network of sensing devices arranged to measure a spatiotemporal position of one or more users, wherein the at least one network of sensing devices comprises a plurality of cameras distributed over a defined geographic area, the plurality of cameras being remote from the one or more users and configured to measure the spatiotemporal position of the one or more users upon detection thereof,
determining from the at least one set of sensing data a plurality of spatiotemporal data points corresponding to the spatiotemporal position of a first user captured over a pre-determined period of time at a plurality of locations within the defined geographic area, wherein a portion of the plurality of spatiotemporal data points corresponds to each of the plurality of locations, the first user having been repeatedly detected by a camera at the respective location during the pre-determined period of time, and
generating the unique spatio-temporal identifier corresponding to the first user in dependence on the plurality of spatiotemporal data points; and
verifying the identity of the first user if the monitored position substantially matches or correlates to a determinable degree to the unique spatio-temporal identifier.

* * * * *